3,634,513
2-METHOXY-5-METHYL-m-XYLYLENEBIS (ISOTHIURONIUM CHLORIDE)

Harold Marvin Foster, Park Forest, Ill., assignor to The Sherwin-Williams Company, Cleveland, Ohio
No Drawing. Filed Oct. 13, 1969, Ser. No. 865,978
Int. Cl. C07c *123/00*
U.S. Cl. 260—564 E      1 Claim

ABSTRACT OF THE DISCLOSURE

A novel compound, 2-methoxy-5-methyl-m-xylylenebis(isothiuronium chloride), is synthesized from 2,6-bis(chloromethyl)-4-methylanisole. The novel compound is useful in the manufacture of 2-methoxy-5-methyl-m-xylylenedithiol, a microbiocide.

DESCRIPTION

This invention relates to 2-methoxy-5-methyl-m-xylylenebis(isothiuronium chloride) and its use in synthesizing a microbiocidal compound. In particular, this invention relates to a method for making the new compound by reacting 2,6 - bis(chloromethyl)-4-methylanisole (which may also be named 2-methoxy-5-methyl-m-xylene dichloride) with thiourea, according to the following reaction:

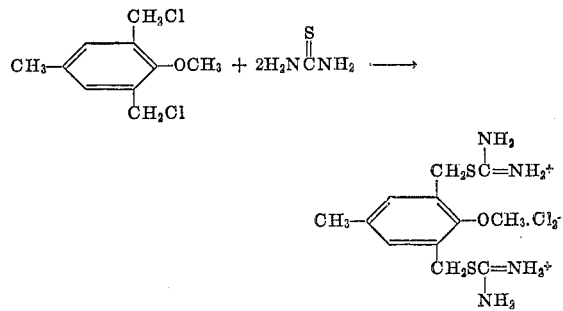

This invention also relates to the use of the new compound as an intermediate in the manufacture of a microbiocidal composition by heating the novel intermediate with an alkali metal salt solution.

The starting materials for use in the practice of this invention may be synthesized from 2,6-bis(hydroxymethyl)-4-methylanisole, which is described by Ullman and Brittner in Ber., 42, 2539 (1909). The reaction of this starting compound with thionyl chloride to produce the precursor is disclosed in my copending U.S. patent application Ser. No. 865,945 filed concurrently herewith and entitled "2-Methoxy-5-methyl-m-xylene dichloride." The precursor may be made by slurrying 120 parts by weight of benzene, 36.4 parts (0.2 mols) of 2,6-bis(hydroxymethyl)-4-methylanisole, ½ part pyridine and, to which is added, at 20–25° C., 52.4 parts (0.44 mols) of thionyl chloride incrementally. Stirring is continued throughout the addition of thionyl chloride and for half an hour thereafter. Then the mixture is heated for one hour under gentle reflux, cooled and poured into an equal volume of ice water. A benzene layer is recovered containing the precursor compound, which is purified before use. Synthesis of 2-methoxy - 5 - methyl-m-xylylenebis(isothiuronium chloride). The manufacture of the novel compound of this invention is described by the following example in which parts by weight are used unless otherwise stated.

To a refluxing solution of 335 parts (4.4 mols) of thiourea in 1632 parts of ethanol was added with agitation a slurry of 438 parts (2 mols) 2,6-bis(chloromethyl)-4-methylanisole and 1208 parts ethanol over a period of 20–30 minutes. The mixture was heated under reflux (about 80° C.) with agitation for about 6 hours and cooled to 60° C. and 1595 parts of acetone was added. The mixture was stirred at ambient temperature (20–25° C.) for about 16 hours, filtered, and dried to give 680 parts of product. 2-methoxy-5-methyl-m-xylylenebis(isothiuronium chloride) was obtained in 91 percent yield.

The product was further purified by dissolving 100 parts of the solid in 480 parts of methanol, which was clarified and concentrated to half volume by evaporation. The composition was recrystallized to give 82 parts of the pure solid compound which decomposes upon heating at 227–229° C.

Analyses: The structure assigned to the compound was confirmed by infrared and nuclear magnetic resonance spectra. Thin layer chromatography indicated that the purified sample was homogeneous. The results of microanalysis are given below:

Calculated for $C_{12}H_{20}Cl_2N_4OS_2$ (parcent): C, 38.80; H, 5.43; Cl, 19.10; N, 15.29; S, 17.42. Found (percent): C, 38.40; H, 4.92; Cl, 18.83; N, 15.01; S, 17.42.

Use: When heated under reflux with a molar excess of sodium carbonate in aqueous solution, 2-methoxy-5-methyl-m-xylylenebis(isothiuronium chloride) is converted to 2-methoxy-5-methyl-m-xylylenedithiol. Details of this reaction and the microbiocidal use of the product are given in my copending U.S. patent application Ser. No. 865,981, filed concurrently with this application and entitled "2,6-bis(thiomethyl)-4-methylanisole," as in the following example: A mixture of 372 parts of 2-methoxy-5-methyl - m - xylylenebis(isothiuronium chloride), 210 parts anhydrous sodium carbonate, and 3000 parts water is heated under reflux for about 1.5 hours, then cooled to ambient temperature. The reaction mixture is extracted with chloroform, dried and the product is recovered. The dithiol derivative can be used for inhibiting growth of microorganisms, such as yeast and fungi by application to the loci of the microorganisms in a suitable carrier such as powder, liquid dispersion or paste at a concentration of about 1 percent. Likewise, the final product may be incorporated into films, fibers, or coatings for protection against attack by microorganisms.

I claim:
1. 2-methoxy - 5 - methyl-m-xylylenebis(isothiuronium chloride).

References Cited
UNITED STATES PATENTS

| | | | |
|---|---|---|---|
| 2,514,650 | 7/1950 | Knott et al. | 260—564 E X |
| 2,999,046 | 9/1961 | Rosen | 260—564 E X |

OTHER REFERENCES

Pattison et al., Journal of Applied Chemistry (London), vol. 6 (1956), pp. 161–68.

BERNARD HELFIN, Primary Examiner
G. A. SCHWARTZ, Assistant Examiner

U.S. Cl. X.R.
106—15; 260—609 F, 612 D, 999